United States Patent [19]

Magorien

[11] Patent Number: 5,007,728
[45] Date of Patent: Apr. 16, 1991

[54] DETACHABLE TWO-PIECE TEMPLE

[76] Inventor: Robert M. Magorien, 4324 Leatherwood Ct., Camarillo, Calif. 93010

[21] Appl. No.: 457,147

[22] Filed: Dec. 26, 1989

[51] Int. Cl.$^5$ ................................................ G02C 5/20
[52] U.S. Cl. ..................................... 351/118; 351/119
[58] Field of Search ........................ 351/116, 118, 119

[56] References Cited

U.S. PATENT DOCUMENTS 3,133,141  5/1964  Anderson ............................. 351/118
3,667,834  6/1972  Davison et al. ....................... 351/118

Primary Examiner—Paul M. Dzierzynski
Attorney, Agent, or Firm—Albert O. Cota

[57] ABSTRACT

A detachable two-piece temple (10) having a front piece (12) swivelly attached to the back of an eyeglass frame (80) and a back piece (40) that is quickly, easily and securely attached and detached from the front piece (12). The front piece (12) has extending from its rear surface a resilient locking rod (22), that includes a lock notch (24), and a guide rod (30). The back piece (40) includes a locking rod cavity (50) sized to accept and retain the rod (22), a guide rod cavity (52) that is sized to accept and retain the rod (30), and a locking-rod release opening (54) that has a lock notch catch (56). When the back piece is inserted into the front piece, the locking rod (22) and guide rod (30) enter their respective cavities. When fully entered, the lock notch (24) slips upwardly into the lock notch catch (50) to securely hold the two pieces together. To release the two pieces, the lock notch (24) is depressed while the back piece (40) is pulled away from the front piece (12). The temple (10) can be used to enhance fashion glasses by allowing temples of various colors and patterns to be used with eyeglass frames. The temple may also be designed to serve as safety glasses by attaching to the front and back pieces (12)(40), a top safety shield (60) and a side safety shield that prevent foreign objects from entering the area of the eyes.

1 Claim, 3 Drawing Sheets

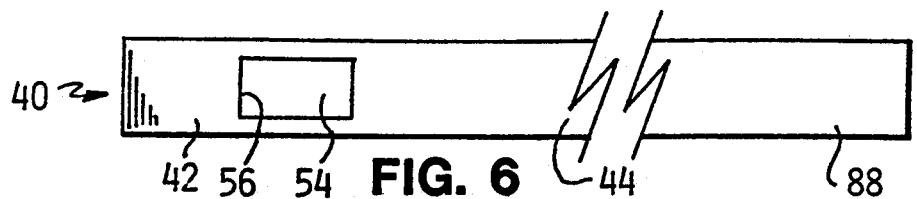
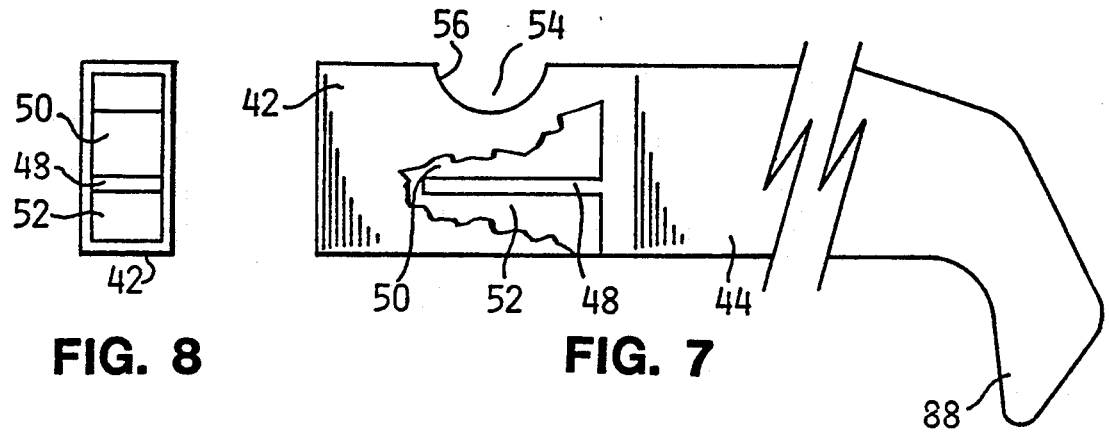
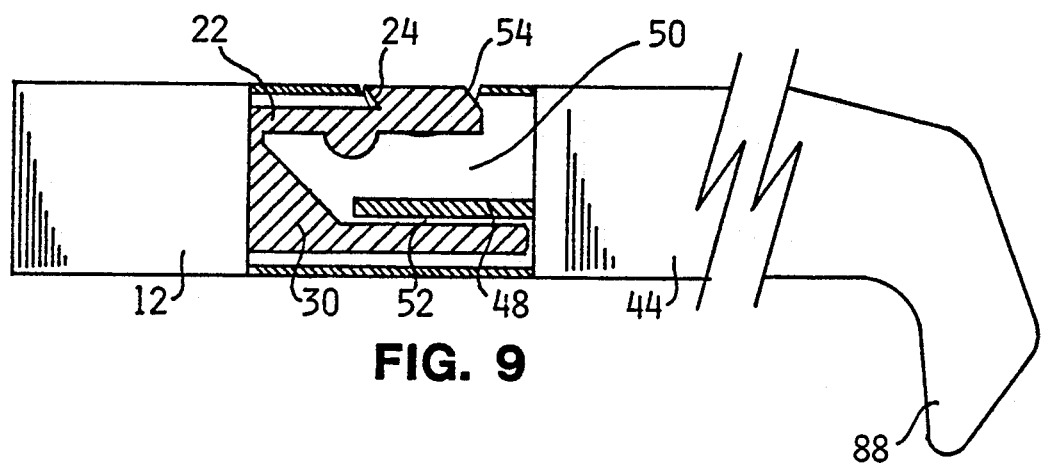
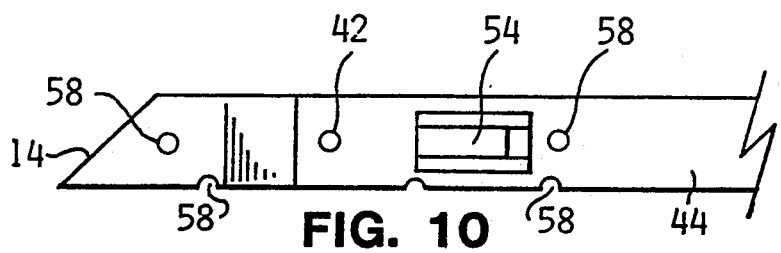
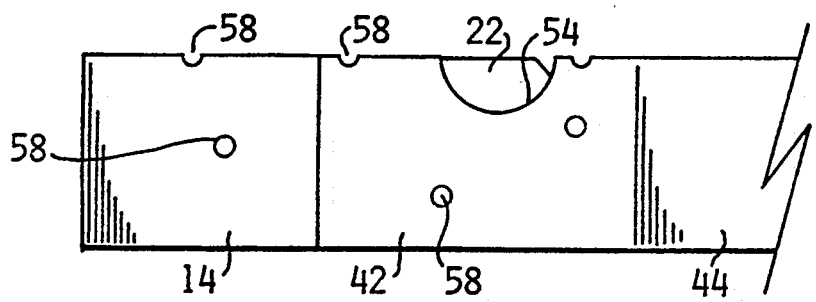

DETACHABLE TWO-PIECE TEMPLE

TECHNICAL FIELD

The invention pertains to the general field of eyeglasses and more particularly to eyeglasses having interchangeable temples where one set of temples may serve as fashion temples and the other, which includes top and side safety shields, function as safety glasses.

BACKGROUND ART

Since the advent of the industrial revolution preventing injuries to machine operators or workers that work near certain machines and assembly/process lines has been a major concern to both industry and government agencies. These workers are prone to various types of industry-related accidents and are especially susceptible to eye injuries resulting from flying particles and other hazardous substances. As a consequence of these eye injuries general industry safety orders and government regulations have been implemented to safeguard employees working in locations where there is a risk of receiving such injuries.

The primary eye safeguard is the wearing of safety glasses, goggles or face shields in known hazardous areas. If a worker does not use prescription eyeglasses if is a simple matter to obtain and wear one of these protective devices. However, for those workers that must use prescription eyeglasses the wearing of goggles and face shields over their glasses is at best cumbersome and in many cases can reduce or distort peripharal vision, viewing clarity and depth perception. Because of these viewing problems, users of prescription eyeglasses, in most cases, will purchase a second pair that are made with safety glass.

To compound the problem, the safety eyeglasses, in most instances, must have temples that include top and side safety shields. If the glasses are equipped with conventional temples a set of snap-on safety shields must be attached before entering a restricted area.

A search of the prior art disclosed some eyeglass frames having detachable temples. However, the attachment method did not include a positive lock nor were any eyeglasses located that included detachable temples that incorporated top and side shields. Additionally, the search of the prior art did not disclose any patents that read directly on the claims of the instant invention however, the following U.S. patents were considered related:

| U.S. Pat. No. | INVENTOR | ISSUED |
| --- | --- | --- |
| 4,798,455 | Yoe, etal | 17 January 1989 |
| 3,582,192 | Gitlin | 1 June 1971 |
| 3,021,753 | Vinson | 20 February 1962 |

The yoe patent discloses user reconfigurable novelty glasses that include separate eyeglasses frames and temples. The frames and temples may be readily combined with each other and with other separate eyeglass frames and temple pieces to form a variety of novelty sunglasses. The invention features a design that allows each eyeglass frame to be used with either the user's right or left eye and each temple piece may be used over either the user's right or left temple and ear.

The Gitlin patent discloses an eyeglass frame that has relatively light, decorative overlays. The overlays are removably mounted on the frame and/or temples and can be readily removed and replaced by different colored or design overlays.

The Vinson patent discloses an eyeglass frame that is detachable from the temples. The aesthetic value of the frame is improved by having an eyeglass frame/temple fastening means that is concealed from view. One of the objects of the invention is to provide an outer eyeglass frame which is readily interchangeable so that the style or color of the frame may be selected to correspond to, or complement the wardrobe of the wearer.

DISCLOSURE OF THE INVENTION

The detachable two-piece temple is designed to replace the conventional one-piece eyeglass frame temple. The inventive temple, in its basic form, consists of a front piece and a back piece that integrally includes a front section and a back section.

The front piece has on its front inward surface one side of a standard bifurcated hinge that fits into a corresponding bifurcated hinge attached to the eyeglass frame. The hinge pair is held together by inserting a hinge pin through a set of bores projecting through the hinge pair. Thus, the front piece is hingedly attached to the back of the eyeglass frame. From the back surface of the first piece extends outwardly a resilient locking rod that includes a lock notch, and spaced apart from the locking rod is a guide rod that in addition to serving as a guide also adds structural integrity to the front piece.

The front section of the back piece has a forward facing cavity that is divided into a locking rod cavity and a guide rod cavity. Between the two cavities, nearer the guide rod, is a cavity separator that separates the two cavities and adds support and guidance to the guide rod. On the upper surface of the front section is located a locking rod release opening that has on one edge a lock notch catch. The integrally attached back section consists of the temple extension that includes the ear piece.

To attach the back piece to the front piece, the back piece cavity is placed over the resilient locking rod and guide rod. When the lock rod has traveled a pre-determined distance into the cavity, the lock notch snaps into the lock notch catch located on the locking rod release opening to positively hold the two pieces together. To release the two pieces, the lock notch is depressed, with a finger or other small object, to allow the notch to slip under the lock notch catch; while the notch is being depressed, the back piece is pulled away to effect a release.

The basic form of the two-piece detachable temple, as above described, can be easily modified to include top and side safety shields. In this form, when the eyeglasses are made with safety glass, the eyeglasses with the two-piece temple serve as safety glasses. Safety glasses are required to be used in many industrial areas where employees must be protected from eye injuries that may result from flying particles and other hazardous substances. The invention discloses three types of safety shields; a top and side shield integrally molded into the back piece, individual top and side shields and a single combination top and side shield. In the later two designs, the shields are attached by means of corresponding snap lock fasteners located on both the front and back pieces and on the inside of the shield(s).

In view of the above disclosure, it is the primary object of the invention to have a pair of eyeglass temples that are easily, quickly and securely attached and detached from the eyeglass frame. It is also an objective to have eyeglass temples that can be mixed and matched, in fashion applications, to suit the likes of the user; or that can be made with top and side safety shields to function as industrial safety glasses. In addition, it is also an object to have two-piece detachable temples that:

include a positive locking means that allow the temples to be securely locked to the eyeglass frame, can be produced in a variety of colors and patterns for use in fashion eyeglass applications, allows users of prescription eyeglasses to purchase one pair of eyeglasses made with safety glass and a set of two-piece detachable temples: one pair for conventional use and the other pair, that includes top and side safety shields, for safety glasses. Thus, a changeover from normal use to safety use and vice versa can be easily and quickly made by attaching the applicable temples, can replace conventional temples by merely removing the temple side of a hinge and attaching it to the two-piece temple, and are cost effective from both a manufacturing and consumer point of view.

BRIEF DESCRIPTION OF THE DRAWINGS

FIG. 6 is a top view of the second piece.

FIG. 7 is a partial cutaway side view of the second piece.

FIG. 8 is a front end view of the second piece.

FIG. 9 is a partial cutaway side view showing both the front piece and second piece in their attached positions.

FIG. 10 is a top view of the second piece showing typical locations for the first snap-lock fasteners.

FIG. 11 is a side view of the second piece showing typical locations for the first snap-lock fasteners.

BEST MODE FOR CARRYING OUT THE INVENTION

Figure 1:
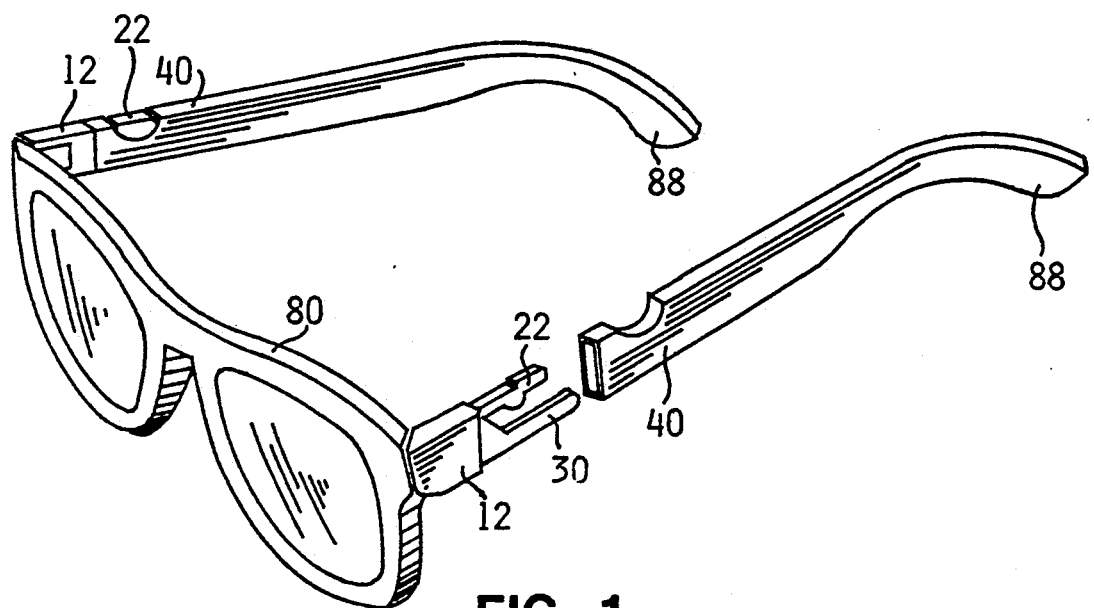
FIG. 1 is a perspective view of the detachable two-piece temple showing one temple in its attached configuration and the other temple in its detached configuration.

The best mode for carrying out the two-piece temple is presented in terms of a preferred embodiment that is designed to be easily, quickly and securely attached and detached from an eyeglass frame and that can be produced with or without top and side safety shields.

The detachable two-piece temple 10, as shown in FIGS. 1-16 is comprised of two basic elements, a front pice 12 having a front surface 12a and a back surface 12b and a back piece 40 that further consists of a front section 42 and a back section 44. The front piece is comprised of four major elements; a temple bifurcated hinge 16, a resilient locking bar 22 that includes a lock notch 24, and a guide rod 30. The front section 42 of the back piece 40 is comprised of seven major elements; a forward facing cavity 46 having a cavity separator 48 that separates a locking rod cavity 50 and a guide rod cavity 52, a lock notch catch 56 located in one end of a locking rod release opening 54, a top safety shield 60 and a side safety shield 68. The back section 44 of the back piece includes a temple ear piece 88.

Figure 2:
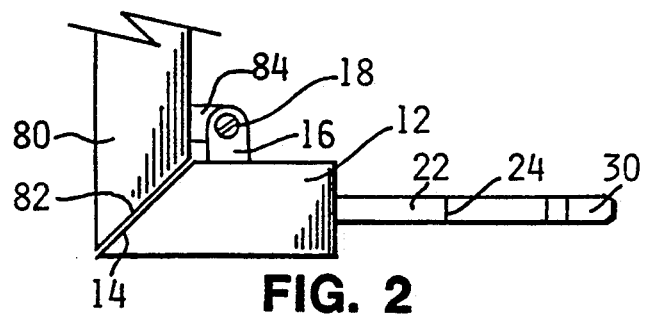
FIG. 2 is a top view of the front piece attached to the eyeglass frame.
Figure 4:
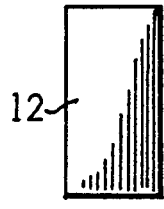
FIG. 4 is a front end view of the first piece.

The front piece 12, as shown in FIGS. 1-5, has on its front surface 12a a means to have it swivelly attached to the back of an eyeglass frame 80. In the preferred embodiment, the attaching means is accomplished by having the front piece 12 include on its forward, inward side a temple bifurcated hinge 16. The hinge 16 is sized to swivelly fit into a corresponding eyeglass frame bifurcated hinge 84 to thus form a hinge pair as shown in FIG. 2. The hinge pair has therethrough a hinge pin bore 18 into which is inserted a hinge pin 86 to swivelly retain the hinge pair.

Figure 3:
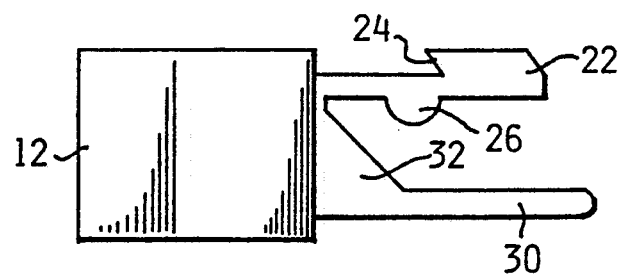
FIG. 3 is a side view of the front piece.
Figure 5:
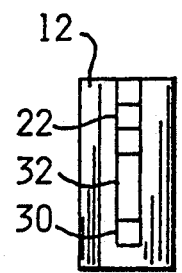
FIG. 5 is a back end view of the first piece.
Figure 12:
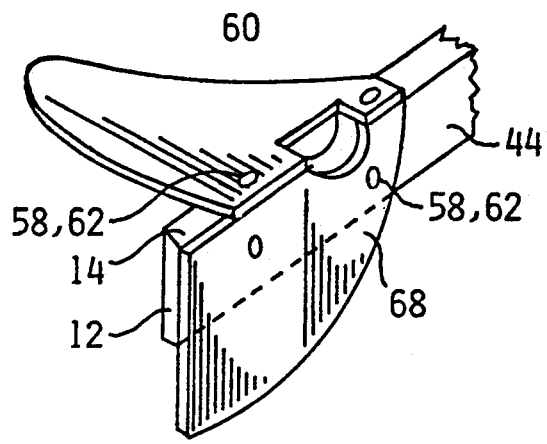
FIG. 12 is a perspective view of a second piece having attached by means of snap-lock fastener, a top safety shield and a side safety shield.
Figure 13:
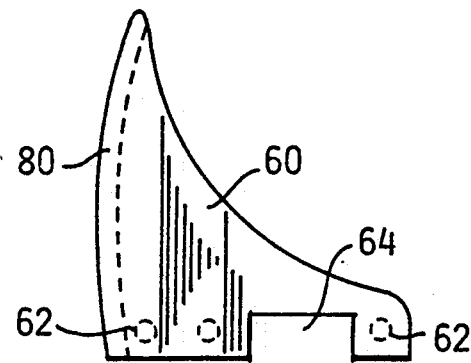
FIG. 13 is a top view of the top safety shield attached.
Figure 14:
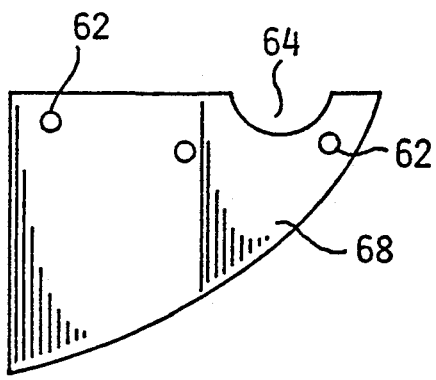
FIG. 14 is a side view of the side safety shield attached.
Figure 15:
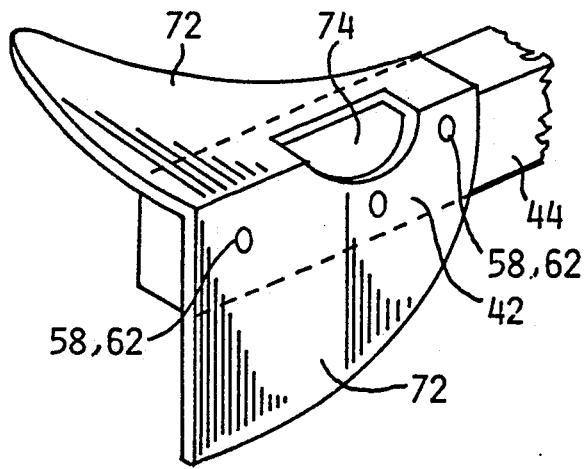
FIG. 15 is a perspective view of a combination top and side safety shield attached to the back piece.

From the back surface 12b of the front piece 12 integrally extends outwardly the resilient locking rod 22 as best shown in FIG. 3. The rod 22 includes a lock notch 24 that is used to hold the front piece 12 to the back piece 40 as described infra and may include a strength bump 26 at the intersection of the lock notch 24.

Spaced apart from the locking rod 22 and integrally extending outwardly from the back surface of the front piece is the guide rod 30 as also shown in FIG. 3. The guide rod 30 in the preferred embodiment is shown below the resilient locking rod 22. However, the two rods can easily be reversed in position and still provide their identical functions. The guide rod 30 may also include an integrally formed reinforcing strut 32, as shown in FIG. 3, and the rod may be tapered (not shown) to provide additional holding friction.

The front of the front piece 12, in the preferred embodiment as shown in FIG. 2, has an angled edge 14 that is cut to correspond with the angled edge 82 of the eyeglass frame 80. Thus, when the detachable two-piece temples are extended to their wearing position, the angled front piece 12 interfaces with the angle of the eyeglass frame 80.

The back piece 40 consists of a front section 42 and a back section 44 as shown in FIGS. 6-8. The front section 42 has a forward facing cavity 46 that includes a locking rod cavity 50 that is sized to accept and retain the resilient locking rod 22 and a guide rod cavity 52 that is likewise sized to accept and retain the guide rod 30.

In the preferred embodiment, the front section 42 has a locking-rod release opening 54 that extends from the top surface of the front section 42. The opening 54 can also be cut from the bottom surface of the front section (not shown) to accommodate a resilient locking rod 22 that is located below a guide rod 30. On the front edge of the locking-rod release opening 54, as best shown in FIG. 7, is the lock notch catch 56. The catch is sized to catch and hold the lock notch 24 when the locking rod 22 is fully inserted into the locking rod cavity 50. When the lock notch is so held, as best shown in FIG. 9, the front and back pieces 12, 40 are held together. The locking-rod release opening 54 is sized to allow the lock notch 24 to be depressed, with a finger or other small object, to allow the notch to slip under the lock notch catch. While depressing the notch, the back piece 40 is pulled away to effect a release from the front piece 12.

To add structural integrity to the cavity 46, a cavity separator 48 is located within the cavity between the locking rod cavity 50 and the guide rod cavity 52. As shown in FIG. 9, the bottom surface of the separator is just above or may be in contact with the upper surface of the guide rod 30. Thus, the guide rod 30 is partially supported by the cavity separator 48.

The back section 44, as best shown in FIGS. 1 and 7, consists of an ear-piece extension that includes a temple ear-piece 88.

The detachable two-piece temple 10, as previously disclosed, can be designed with or without top and side safety shields. When these shields are not included the inventive temples function and have utility as replaceable temples for use with fashion eyeglasses. In this application, the front piece 12 and the back piece 40 can be made in selectable colors and patterns. Various mix and match variations are possible and are selected to match the color scheme of the eyeglass frames or to suit the taste and/or mood of the individual user.

The detachable two-piece temple 10 can be designed with front and back pieces that allow either separate top and side safety shields or a single combination top and side shield to be attached. Additionally, the back piece can be molded to include integral top and side shields. These options are next described.

In one design configuration, as shown in FIGS. 1, 10 and 11, the front piece 14 and the front section 42 of the back piece 40 include on their upper surfaces a plurality of first snap lock fasteners 58. To these snap lock fasteners 58 is attached a top safety shield 60 and a side safety shield 68. The two shields are shown attached to the front piece 12 and the back section 42 of the lock piece in FIG. 12 and are individually shown in FIGS. 13 and 14.

The top safety shield 60 is sized to extend inwardly from the upper surface of the front and back pieces 12, 40 and is configured to cover the area between the upper side of the eyeglass frame 80 and the brow of the face. The bottom surface of the top safety shield 60, that is the surface that extends from the top surface of the front and back pieces, has a corresponding plurality of mating second snap lock fasteners 62. When the first or second snap locks are pressed together, the top safety shield 60 is held in place.

The side safety shield 68 is sized to extend downwardly from the sides of the front and back pieces and is configured to cover the area between the bottom surface of the front and back pieces and the outer edge of the eyeglass frame 80. To thus prevent flying particles from entering from the side of the face. The inside surface of the side safety shield 68 has a corresponding plurality of mating second snap lock fasteners 62. When the first and second snap locks are pressed together the side safety shield 68 is held in place.

As an alternative to having separate top and side shields, a combination top and side safety shield 72 may be used. The combination shield is shown attached to the sides of the front piece 12 and the front section 42 of the back piece 40 in FIG. 15. The top and side section of the combination shield 72 include an opening 74 that is in alignment with the locking rod release opening 54 and the side section of the combination shield has a corresponding plurality of second snap lock fasteners 62. When the first and second snap lock are pressed together, the combination top and side safety shield 72 is correctly aligned and held in place.

Figure 16:
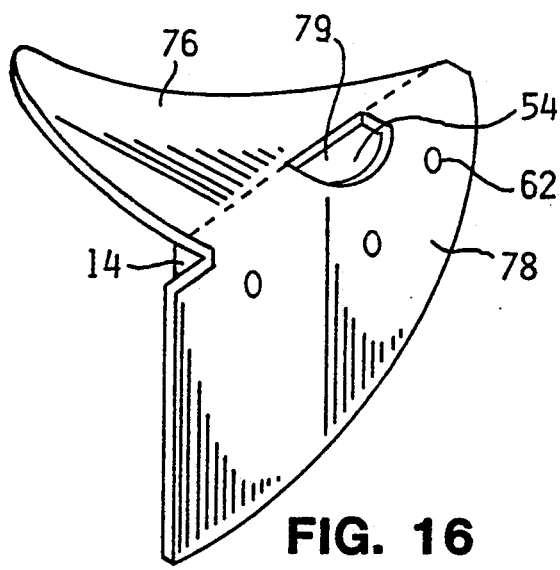
FIG. 16 is a perspective view of the second piece having integrally formed top and side safety shields.

As a third alterative to providing eye and face protection, an integrally molded top safety shield 76 and bottom safety shield 78 may be used. As shown in FIG. 16, the top safety shield 76 integrally extends from the top of the back piece 40 and is configured to cover the area between the upper edge of the eyeglass frame and the brow of the face. Likewise, the side safety shield 78 is configured to cover the area between the outer edge of the eyeglass frame 80 and the side of the face near the eye. At the intersection of the top and side shield is located an opening 79 that is in alignment and corresponds to the locking-rod release opening 54. The opening 79 allows access to the resilient locking rod 22. The detachable two-piece temple 10 and top and bottom safety shield may be made of any material such as metal, wood or plastic with a thermoplastic preferred. Preferably, the front piece 12 and back piece 40 are injected molded. Alternatively, the back piece can be made with inner and outer sections with the outer section consisting of one half of the cavity 46 and the ear attachment section 88. The inner half would consist of the other half of the cavity 40 and would be joined to the outer half by an adhesive or other fastening means. The shield may also be made oversize to allow the specific eyeglass user to cut and shape the shields to conform to the face contour of the individual user.

Figure 17:
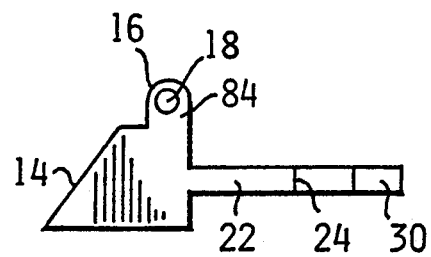
FIG. 17 is a top view of a front piece that is truncated at the back edge of the temple bifurcated hinge.

While the invention has been described in complete detail and pictorially shown in the accompanying drawings it is not to be limited to such details, since many changes and modifications may be made to the invention without departing from the spirit and the scope thereof. For example, the front piece 12 may be truncated at the back edge 4 of the temple bifurcated hinge 16 as shown in FIG. 17. Additionally, the first snap lock fasteners 58 may be used to attach various ornamental plaques that include advertising indicia, sport figures or side views of favorite automobiles. Hence, it is described to cover any and all modifications and forms which may come within the language and scope of the claims.

I claim:

1. A detachable two-piece temple comprising:
A front piece having a front surface and a back surface, said front piece further comprising:
   (1) means to swivelly attach the front surface of said front piece to the back of an eyeglass frame.
   (2) a resilient locking rod that includes a lock notch and that integrally extends from the back surface of said front piece.
   (3) a guide rod spaced from said locking rod and that integrally extends from the back of said front piece.
   (4) a plurality of first snap lock fasteners located on the outer surface of said front piece.
B. a back piece having a front section and a back section.
   (1) said front section having a forward facing cavity that further comprises:
      (a) a locking rod cavity sized to accept and retain said resilient locking rod,
      (b) a guide rod cavity sized to accept and retain said guide rod,
      (c) a locking-rod release opening having a lock notch catch sized to catch and hold said lock notch when said locking rod is inserted into said locking rod cavity such that when so held, said front and back pieces are held together, where said locking-rod release opening also functions and is sized to allow said lock notch to be depressed and allow said back piece to be pulled away from said front piece.
(2) said back section consisting of a temple earpiece extension that fits over the ear of the eyeglass user,
(3) a plurality of first snap lock fasteners located on the outer surface of said back piece, and
C. a combination top and side safety shield, with the top and side sections of said shield having an opening in alignment with said locking rod release opening, and with the side section of said shield having a corresponding plurality of second snap lock fasteners that when pressed into said first snap lock fasteners on said front and back pieces said combination top and side safety shield is corrected aligned and held in place, wherein said combination shield is made oversize to allow the specific eyeglass user to cut and shape said shield to conform to the contour of the individual's face.

* * * * *